US009592882B2

(12) United States Patent
Butora et al.

(10) Patent No.: US 9,592,882 B2
(45) Date of Patent: Mar. 14, 2017

(54) ELECTRONICALLY CONTROLLED SUSPENSION SYSTEM, METHOD FOR CONTROLLING A SUSPENSION SYSTEM AND COMPUTER PROGRAM

(71) Applicants: Befra Electronic, S.R.O, Horní Suchá (CZ); Gustav Magenwirth GmbH & Co. KG, Bad Urach (DE)

(72) Inventors: Peter Butora, Bohumín (CZ); Jürgen Beier, Ulm (DE); Reiner Künstle, Metzingen (DE); Florian Koller, Metzingen (DE); Christoph Kern, Weil der Stadt (DE)

(73) Assignees: Befra Electronic, S.R.O (CZ); Gustav Magenwirth GmbH & Co. KG (DE)

( * ) Notice: Subject to any disclaimer, the term of this patent is extended or adjusted under 35 U.S.C. 154(b) by 0 days.

(21) Appl. No.: 14/627,158

(22) Filed: Feb. 20, 2015

(65) Prior Publication Data
US 2015/0197308 A1      Jul. 16, 2015

Related U.S. Application Data

(63) Continuation of application No. PCT/EP2013/067286, filed on Aug. 20, 2013.

(30) Foreign Application Priority Data

Aug. 21, 2012  (DE) .................. 10 2012 214 867
Aug. 24, 2012  (DE) .................. 10 2012 215 062

(51) Int. Cl.
*B62K 25/30*     (2006.01)
*B62K 25/20*     (2006.01)
(Continued)

(52) U.S. Cl.
CPC .............. *B62K 25/20* (2013.01); *B62J 1/06* (2013.01); *B62K 25/08* (2013.01); *B62K 25/10* (2013.01);
(Continued)

(58) Field of Classification Search
CPC ..... B62K 19/36; B62J 1/06; B62J 1/10; B62J 1/02
See application file for complete search history.

(56) References Cited

U.S. PATENT DOCUMENTS 7,254,516 B2 *   8/2007   Case, Jr. ............... A63B 24/00
                                                        702/142
8,308,124 B2    11/2012   Hsu
(Continued)

*Primary Examiner* — Anne Marie Boehler
*Assistant Examiner* — Marlon A Arce
(74) *Attorney, Agent, or Firm* — Mayback & Hoffman, P.A.; Gregory L. Mayback

(57) ABSTRACT

An electronically controlled suspension system for a bicycle includes at least one spring element between first and second parts the bicycle, both parts being movably interconnected. At least one parameter of the spring element is modified. At least one actuator influences the spring element to modify the at least one parameter. An electronic module produces a control signal for the at least one actuator. A control device is influenced by the control signal produced by the electronic module. The control device is connected to at least one of the electronic module and the actuator through a radio signal. A corresponding method controls the suspension system for the bicycle and a computer program executes the method.

15 Claims, 9 Drawing Sheets

(51) Int. Cl.
  *B62K 25/10*   (2006.01)
  *B62J 1/06*   (2006.01)
  *B62K 25/08*   (2006.01)
  *B62K 25/04*   (2006.01)
  *B62J 99/00*   (2009.01)

(52) U.S. Cl.
  CPC .. *B62J 2099/002* (2013.01); *B62J 2099/0026* (2013.01); *B62K 2025/044* (2013.01); *B62K 2025/045* (2013.01); *B62K 2207/04* (2013.01)

(56) References Cited

U.S. PATENT DOCUMENTS

| | | | |
|---|---|---|---|
| 8,655,561 B2 * | 2/2014 | Kitamura | B62M 25/08 701/51 |
| 8,814,109 B2 * | 8/2014 | Laird | B62J 1/08 135/141 |
| 2005/0029033 A1 * | 2/2005 | Rip | B62H 5/20 180/220 |
| 2012/0104810 A1 * | 5/2012 | Walsh | B62K 19/36 297/215.13 |
| 2012/0253600 A1 * | 10/2012 | Ichida | B62M 25/08 701/37 |
| 2013/0221713 A1 * | 8/2013 | Pelot | B62J 1/02 297/215.13 |
| 2014/0354038 A1 * | 12/2014 | Kosaka | B62M 25/08 307/9.1 |
| 2015/0073656 A1 * | 3/2015 | Takamoto | B62J 1/06 701/37 |
| 2016/0031506 A1 * | 2/2016 | Lloyd | B62J 1/10 701/49 |

* cited by examiner

ELECTRONICALLY CONTROLLED SUSPENSION SYSTEM, METHOD FOR CONTROLLING A SUSPENSION SYSTEM AND COMPUTER PROGRAM

CROSS-REFERENCE TO RELATED APPLICATIONS

This is a continuing application, under 35 U.S.C. §120, of copending international application No. PCT/EP2013/067286, filed Aug. 20, 2013, which designated the United States and was not published in English; this application also claims the priority, under 35 U.S.C. §119, of German Patent Application Nos. 10 2012 214 867.1, filed Aug. 21, 2012, and 10 2012 215 062.5 filed on Aug. 24, 2012; the prior applications are herewith incorporated by reference in their entirety.

STATEMENT REGARDING FEDERALLY SPONSORED RESEARCH OR DEVELOPMENT

Not Applicable

FIELD OF THE INVENTION

The present systems and methods lies in the field of cycles. The present disclosure relates to an electronically controlled suspension system for a bicycle, comprising at least one spring element that is disposed between a first part of the bicycle and a second part of the bicycle, both parts being movably interconnected, wherein at least one parameter of the spring element can be modified, and at least one actuator that acts on the spring element to modify the at least one parameter, and an electronic module serving for producing a control signal for the at least one actuator.

BACKGROUND OF THE INVENTION

U.S. Pat. No. 6,050,583 to Bohn discloses equipping a bicycle with a suspension. The suspension is dampened by an oil bath in that the oil flows through a bore in a piston of a piston-cylinder pair of the suspension. Furthermore, this known suspension has a micromechanical acceleration sensor and an actuator to adapt the damping force to the acceleration acting on the bicycle by varying the openings. The acceleration sensor, the control electronics and the actuator are connected to one another through cable connections.

This known apparatus has a drawback in that the cable connections can corrode or tear off when riding the bicycle off-road, which limits the operational reliability of the apparatus. Although it is possible by this known apparatus to adapt the damping, it is not possible to adapt the elastic force and, therefore, an adaptation to different riding conditions is only rudimentarily possible.

Thus, a need exists to overcome the problems with the prior art systems, designs, and processes as discussed above.

SUMMARY OF THE INVENTION

The systems and methods described provide an electric chassis for a bicycle that overcomes the hereinafore-mentioned disadvantages of the heretofore-known devices and methods of this general type and that provide such features with an improved operational reliability and/or offers different adjusting possibilities to enable an automated adaptation to different operating conditions.

The invention proposes an electronically controlled suspension system for a bicycle. The suspension system can be attached solely to the front wheel of a bicycle. In other embodiments of the invention, the suspension system can be disposed at both the front wheel and the rear wheel. In some embodiments of the invention, the suspension system can also be attached solely to the rear wheel. In yet another embodiment of the invention, the suspension system can be disposed in a seat post and/or in a steering tube. The suspension system, on the one hand, raises the riding comfort for the bicycle user. Moreover, the suspension system can enable an improved grip of the wheels to the ground to improve the traction and/or transmit greater steering or braking forces. This serves for positively influencing the driving safety or the off-road usability of the bicycle.

In some of the embodiments of the invention, the bicycle can be a human-powered, two-wheeled vehicle, e.g., a mountain bike, a trekking bike or a road bike. In some of the embodiments of the invention, the bicycle can have three wheels, i.e., two front wheels and one rear wheel or one front wheel and two rear wheels, for example. In some of the embodiments of the invention, the bicycle can have an electric motor that drives the bicycle either at least partially as an alternative to the human-powered pedal drive or that supports the cyclist in pedaling. As a result, the bicycle can reach a higher speed and/or a greater range and/or manage steeper climbs while the cyclist's energy input remains constant.

The inventive bicycle has at least one spring element that is disposed between a first part of the bicycle and a second part of the bicycle, both parts being movably connected to one another. For example, the first, immovable part of the bicycle can be the frame of the bicycle or the stanchion tubes of a fork or the seat post part that can be connected to the frame. The second, movable part of the bicycle can be formed by the slider tubes of a fork or by a movably mounted chainstays kinematics of a rear wheel suspension system or the seat post part that can be connected to the saddle. Both the own weight of the bicycle, the user's weight and also dynamic impacts on the wheels result in a relative movement between the first part and the second part of the bicycle. The spring element counteracts this movement.

In some of the embodiments of the invention, the spring element can contain a leaf spring or a helical spring, made of steel, for example. In other embodiments of the invention, the spring element can comprise an air suspension, i.e., a piston-cylinder pair, which encloses a self-contained air volume that is compressed on the application of external forces. Furthermore, the spring element can have a device for producing a damping force, e.g., an oil volume that flows through the openings of a piston.

As a result of a mechanical interference with components of the spring element, at least one parameter of the spring element can be modified. By modifying the spring element, the handling of the bicycle equipped with the spring element can be changed, e.g., the energy dissipation in the suspension can be reduced or the response pattern can be adapted to different grounds. The influenceable parameter of the spring element can be selected from the elastic force of the pressure stage and/or the damping force and/or the suspension travel and/or the lock-out, i.e., a fixation apparatus by which the suspension can be fully blocked. To this end, the spring element can be equipped with an operating lever and/or an adjustment wheel, which performs the mechanical interventions at the spring element in generally known manner to carry out the desired modifications. The mechanical interventions can comprise, e.g., the opening or closing of a valve or the change in the spring preload or the modification of the clear width of at least one opening or the application of an electric field or the application of a magnetic field.

According to the invention it is now proposed to actuate the operating element of the spring element through at least one actuator that influences the spring element to modify the at least one parameter.

The actuator is actuated by a control signal that can be a pulse-width modulated electric signal, for example. In other embodiments of the invention, the control signal can be an analog current or voltage signal. It can determine either the on-time or off-time of an actuator or its absolute position. The control signal is produced by an electronic module.

The electronic module produces the control signal depending on at least one input variable which can be produced with at least one control. The control can generate the input variable either depending on the cyclist's desire or in automated fashion based upon measured values that detect the respective operating condition of the bicycle.

According to the invention, it is now proposed to connect the control to the electronic module, preferably through a radio signal, and/or to connect the actuator to the electronic module through a radio signal. As a result, cabling along the frame is dispensed with, and, therefore, weight can be reduced, on the one hand, and a reliable transmission of the signals can be enabled, on the other hand, because damage to the cable is now impossible. The radio signal can be coded in digital or analog fashion. In some of the embodiments of the invention, the radio signal can be around 433 MHz in the frequency band. In other embodiments of the invention, the radio signal can be around 2.4 GHz in the frequency band. The radio signal can be encoded to avoid an impairment of different bicycles riding side by side. Furthermore, the electronically controlled chassis cannot be manipulated from the outside when the radio signal is encoded. The encoding can be made with generally known cryptographic methods, e.g., AES, WPA, WEP, or other methods. The radio signal can realize a generally known interface, e.g., WLAN or Bluetooth or near-field communication (NFC).

In some embodiments, the control can be an operating element and/or a tilt sensor and/or a position sensor and/or an acceleration sensor. The user of the bicycle can manually interfere through the operating element and, e.g., block the suspension or the damping force and/or adapt the suspension travel to a desired damping pattern. In other embodiments of the invention, the control can include a tilt sensor which, e.g., detects a lateral tilt of the bicycle when travelling on curved roads and/or identifies climbs and slopes, and, therefore, a relatively soft spring characteristic can be chosen in downhill rides and a relatively hard spring characteristic can be chosen in climbs including major pedal power to avoid or reduce an unintended shaking of the chassis. For the same purpose, it is also possible to use an optional torque sensor that detects the pedal power produced by the cyclist. In some of the embodiments of the invention, the control can alternatively or additionally contain a position sensor by which the position of the bicycle on the surface of the earth is identifiable. In some of the embodiments of the invention, the position sensor can be or contain a radio navigation system, e.g., GPS, Glonass, Compass or Galileo. To increase accuracy, the position sensor can also receive and process additional terrestrial radio signals. Additional terrestrial radio signals can be selected from differential GPS or a cellular radio signal, such as GSM, LTE or UMTS.

In some of the embodiments, the control can contain a cell phone or be a cell phone. The cell phone can be connected to the electronic module through a generally known radio connection, such as Bluetooth. In other embodiments of the invention, the cell phone can be connected to the electronic module through a cable connection, e.g., through a USB interface. The system can be feedback-controlled or controlled through the user interface of the cell phone by the user's interferences and/or the electronic module can output current configuration data through the display of the cell phone. In this connection, the cell phone can implement software that translates the user's inputs into a control signal. In some of the embodiments, the cell phone can retrieve software updates or configuration data or topographic information from an online memory through a GSM interface, through a GPRS interface, through an LTE interface or a comparable interface, and provide them to the electronic module or store a safety copy of the memory content of the electronic module on the online memory.

In some of the embodiments, the electronic module can contain a cell phone or be a cell phone. The cell phone can be connected to the actuators and/or at least one control through a generally known radio connection, such as Bluetooth. In some of the embodiments, the cell phone additionally can be used as an operating element. This serves for reducing weight because no separate electronic module and/or operating element has to be attached to the bicycle. The power supply of the electronic module and a GPS system for localization and a memory for topographic data can also be dispensed with when the cell phone is equipped with these components. The accumulator of the cell phone is charged by the user at regular intervals anyhow, and, therefore, separate charging of the electronic unit of the bicycle can be dispensed with. In other embodiments, an additional operating element can be attached to the handlebar of the bicycle, said element being connected to the cell phone, e.g., through a radio interface or a tethered interface. This embodiment has the advantage that the cell phone can be carried along while protected from impact and dust, e.g., in a backpack, while the user still has direct access to the suspension system and the user can be informed of the condition of the system.

In some of the embodiments, the electronic module can contain a map memory for receiving topographic information. The topographic information can represent a course of the road or a road surface so as to always and automatically ensure an optimum adaptation of the parameters of the spring elements from the position of the bicycle and the selected route of travel, without the cyclist having to interfere manually. For example, a relatively hard spring characteristic can be chosen ahead of a curve or it is possible to select a spring characteristic on paved roads that is harder than that on a dirt road. Likewise, the topographic information can contain height data, and, therefore, the parameter of the spring elements can correspondingly be selected based upon climb or slope.

In some of the embodiments, the suspension system can contain a speed sensor that allows the adaptation of the parameter of at least one spring element based upon the riding speed. In some of the embodiments, the speed sensor can be integrated in the position sensor, which simultaneously outputs data as to location and speed. In yet another embodiment, the control can be or contain an acceleration sensor, and, therefore, with great acceleration that applies a corresponding force to the driving wheel, the spring elements can be adjusted by the electronic module such that the applied cyclist's energy is converted as effectively as possible.

In some of the embodiments, the electronic module can contain a microprocessor or a microcontroller to convert the input variable into a control signal. To this end, it is possible to use software that implements a neural network and/or a fuzzy logic and/or a control or feedback-control method. It is thus ensured to always obtain an optimum control signal for the optimum adjustment of the spring elements from a plurality of input variables that can partially also provide vague or inconsistent information.

In some of the embodiments, the method for controlling the spring elements can have a self-learning algorithm, and, therefore, the electronic module detects the preferences of the bicycle user based upon the user's interferences and selects the corresponding parameters of the spring elements so that it is possible to reduce the number of user interferences after a prolonged use of the bicycle by the user. If the bicycle is used by several users, the electronic module can contain a plurality of memory areas, and, therefore, different parameters can be filed for different users to also adapt the riding pattern of the bicycle to several different users.

In some of the embodiments, the tilt sensor or the acceleration sensor can contain or be a micromechanical sensor. This enables a compact, reliable, and cost-effective design of the proposed suspension system, wherein, in some of the embodiments, the sensor can be integrated on a pc board together with the electronic module.

In some of the embodiments, the micromechanical sensor can be a multi-axis sensor that can detect an acceleration and/or a position in two or three axes. As a result, it is possible to detect both a straight acceleration or a deceleration of the bicycle and also a transverse acceleration that occurs in a curve ride. Finally, the system can detect whether the bicycle is accelerated towards the ground by acceleration due to gravity or a value close to the acceleration due to gravity. In such a case, the bicycle is fully off the ground, e.g., in the case of jumps, and, therefore, the characteristic of the suspension system can be adjusted to the hard impact accompanied by the landing.

In some of the embodiments, the micromechanical sensor can be a three-axis sensor that can detect an acceleration in three axes. By integration of the acceleration over time, a speed can be determined in all three spatial directions or the temporal change in the spatial position can be determined by the electronic unit. By integration of the speed over time, the spatial position of the bicycle can be determined. A plurality of riding conditions can be detected from this data using only one three-axis micromechanical sensor. When the bicycle is tilted to the rear, i.e., the front wheel is higher than the rear wheel, the cyclist goes uphill. In this case, a harder spring characteristic can be chosen or the suspension can be blocked or a height-adjustable seat post can be raised to a high position or a lowerable suspension fork in a low, sunken position. When the bicycle is tilted to the front, i.e., the front wheel is lower than the rear wheel, the cyclist goes downhill. In this case, a softer spring characteristic can be chosen or the blocked suspension can be released again or a height-adjustable seat post can be brought into a low position or a lowerable suspension fork can be raised into an upper position. When the bicycle has a lateral tilt, the cyclist drives through a curve. In this case, a harder spring characteristic can be chosen or the suspension can be blocked. When the lateral tilt changes cyclically and/or the acceleration in the direction of travel is greater than a settable limiting value, the cyclist pedals out of the saddle. In this case, a harder spring characteristic can be chosen or the suspension can be blocked.

In some of the embodiments, the operating element can be fixed to a joint attachment element together with a brake lever and/or a gearshift lever. From such a configuration, the number of clamps at the handlebar is reduced to obtain a good reachability of the operating element, on the one hand, and minimize danger of damaging the handlebar tube by clamps, on the other hand.

In some of the embodiments, the actuator can be selected from an electric motor and/or a solenoid-valve controller and/or a piezo-valve controller and/or a controller that contains or is a shape memory alloy. An electric motor can be a stepping motor that can be rotated in a controlled fashion and/or is a gear motor that, at its outer side, provides a speed smaller than that of the rotor. A gear motor can have a worm gear. It is self-locking and, therefore, a once-chosen position can be maintained without consuming any current. An electric motor has the advantage that the power consumption is only small because the electric motor must only be energized if the parameters of the spring elements are actually modified. To energize the electric motor, an H-bridge circuit can be used. A magnetic-valve controller and a piezo-valve controller have the advantage that they can modify the parameters of the spring elements very fast to enable a rapid adaptation to dynamic riding conditions.

In some of the embodiments, an actuator that contains or is of a shape memory alloy can be used to influence the closure of a valve such that a valve opening can be closed or opened or its clear cross-section can be influenced. As a result, it is possible to influence the flow-through of a fluid such as air or oil. This can influence the damping force or fully block the suspension (lock-out). In a further embodiment, a valve opening can be closed or opened by a rotary valve or the clear cross-section thereof can be influenced. The rotary valve can be driven through an electric motor or an element made of a shape memory alloy.

In some of the embodiments, the damping force of at least one spring element can be adjusted by an electrorheological liquid, the viscosity of which changes depending on an electric field. In this case, the actuator can have one or several electrodes that, according to a plate or ring capacitor, expose the oil in the damping element or the electrorheological liquid to an electric field.

In some of the embodiments, the control and/or the electronic module and/or the actuator can have at least one first operating condition and at least one second operating condition, wherein, in the second operating condition, the number of functions that can be executed is reduced and the energy consumption is lowered compared to the first operating condition. The service life of the battery in the electronic module and/or in the control can thus be extended because the full variety of functions and the full energy consumption are only available when the bicycle is actually moved. The number of functions that can be executed in the second operating condition, which can also be referred to as the energy saving condition, can be reduced to such an extent that the components only monitor the use of the bicycle and subsequently return to the first operating condition. In this way, without the user having to actively turn-on the system, a constant availability can be ensured without the batteries being discharged rapidly, e.g., overnight. The operating condition can be switched over by a micromechanical acceleration sensor that changes into the second operating condition when no acceleration is recorded during a settable time and that changes into the first operating condition when an acceleration is recorded again for the first time.

In some of the embodiments, the control and/or the electronic module can contain at least one operating condition indicator. In some of the embodiments, the operation condition indicator can contain at least one LED and/or at least one LCD display. Preferably, but not compulsorily, the operating condition indicator is disposed in an operating element that is attached to the handlebar of the bicycle or on the display of a cell phone. Due to this configuration, the operating condition indicator is in the cyclist's field of vision. The operating condition indicator can indicate, e.g., the currently existing operating condition and/or the currently chosen parameters of the spring elements. In addition, the operating condition indicator can output a warning when the battery state is low. Finally, the operating condition indicator can be adapted to indicate or support the arrangement of a radio frequency and/or a transmission protocol between the control and the electronic module.

In some of the embodiments, the spring element parameter to be modified can be selected from a spring force and/or a damping force and/or a suspension travel and/or a zero position. For example, the suspension travel on paved roads can be reduced to zero and, therefore, there is a safe handling and a direct conversion of the introduced driving output in the advance. When the roads are relatively poor, the suspension travel can be extended in one-step or multi-step fashion until the full suspension travel is available on a very uneven ground.

In some of the embodiments, the spring force can be adapted to result in a rather convenient response or a rather firm response of the spring elements.

Finally, the zero position can be adapted, i.e., the position of the spring elements, when the chassis is unloaded. For example, a suspension fork can be lowered in an up-hill ride to enable a more favorable weight distribution. The fork lowering can be eliminated again in a down-hill ride to have available the full suspension travel.

With the foregoing and other objects in view, there is provided, an electronically controlled suspension system for a bicycle including at least one spring element disposed between a first part of the bicycle and a second part of the bicycle, both parts being movably interconnected, the at least one spring element having at least one parameter that can be modified, at least one actuator operatively influencing the spring element to modify the at least one parameter, an electronic module producing at least one control signal for the at least one actuator, and at least one control device by which the control signal produced by the electronic module can be influenced, the at least one control device having at least one multi-axis micromechanical acceleration sensor.

In accordance with another feature, at least one of the at least one control device and the actuator is connected to the electronic module through a radio signal.

In accordance with a further feature, the multi-axis micromechanical acceleration sensor is adapted to determine an acceleration in three spatial directions.

In accordance with an added feature, the at least one control device comprises at least one of an operating element, a tilt sensor, a speed sensor, a torque sensor, and a position sensor.

In accordance with an additional feature, the bicycle has at least one of a brake lever and a gearshift lever and a joint attachment element disposes the operating element with one of the brake lever and the gearshift lever.

In accordance with yet another feature, the electronic module comprises a map memory to receive topographic information.

In accordance with yet a further feature, the electronic module determines at least one of a speed and a position by integration of data of the acceleration sensor over time.

In accordance with yet an added feature, that the actuator is selected from at least one of an electric motor, a magnetic-valve controller, a piezo-valve controller, a controller containing a shape memory alloy, and a controller being a shape memory alloy.

In accordance with yet an additional feature, at least one of the control device and the electronic module has at least one first operating condition and at least one second operating condition, wherein, compared to the first operating condition, in the second operating condition a number of functions that can be executed is reduced and an energy consumption is lowered.

In accordance with again another feature, at least one of the electronic module changes from the first operating condition to the second operating condition when no acceleration is detected over a settable time and the electronic module changes from the second operating condition to the first operating condition when an acceleration is detected.

In accordance with again a further feature, the position sensor contains at least one radio navigation system.

In accordance with again an added feature, at least one of the electronic module and the operating element includes or is a cell phone.

In accordance with again an additional feature, at least one of the control device and the electronic module contain at least one operating condition indicator and/or at least one of the control device and the electronic module visualize an operating condition by at least one of at least one LED and an LCD display.

In accordance with still another feature, the electronic module enables at least one manual operating condition in which the user influences the control signal produced by the electronic module and the electronic module enables at least one automatic operating condition in which the control signal produced by the electronic module is produced depending on at least one riding parameter.

In accordance with still a further feature, the at least one riding parameter is selected from at least one of a terrain topography, a longitudinal acceleration, a transverse acceleration, a tilt, a driving torque, a speed, and a road condition.

In accordance with still an added feature, the at least one parameter is selected from at least one of a spring force, a damping force, a suspension travel, a zero position, and a saddle height.

With the objects in view, there is also provided a method for controlling a suspension system for a bicycle including the steps of producing an input variable by at least one control device, the input variable representing an acceleration in at least one spatial direction, transmitting the input variable to an electronic module, producing a control signal for at least one actuator with the electronic module, and modifying at least one parameter of at least one spring element with the at least one actuator, the spring element being disposed between first and second parts of the bicycle movably interconnected.

In accordance with still an additional mode, the input variable represents at least one of a driver's desire, a tilt, a terrain topography, a speed, and a road condition.

In accordance with another mode, the at least one parameter is selected from at least one of a spring force, a damping force, a suspension travel, and a zero position.

In accordance with a further mode, the input variable is transmitted to the electronic module through a radio signal.

In accordance with an added mode, at least one of the tilt, the position, and the speed is determined by integration of the acceleration over time.

In accordance with an additional mode, there is provided the step of detecting acceleration in three spatial directions with a three-dimensional micromechanical acceleration sensor.

In accordance with yet another feature, there is provided a data carrier with data stored thereon or a signal sequence suitable for transmission through a computer network and representing data, the data representing a computer program that carries out the method when the computer program is running.

With the objects in view, there is also provided a seat post for a bicycle including a post body having a first end shaped to be connected to a bicycle frame, a second end shaped to be connected to a saddle, at least two longitudinal portions meshing with each other and slidable relative to one another along a longitudinal extension, and a fixing apparatus by which the two longitudinal portions can be fixed to one another in a settable relative position, the fixing apparatus being influenced to selectively fix and unfix by a radio signal.

In accordance with yet a further feature, the radio signal is produced by an operating element.

In accordance with yet an added feature, the radio signal is produced by an electronic module dependent upon terrain topography.

In accordance with a concomitant feature, the two longitudinal portions are connected to each other through a gas pressure spring.

Although the systems and methods are illustrated and described herein as embodied in an electronically controlled suspension system for a bicycle, it is, nevertheless, not intended to be limited to the details shown because various modifications and structural changes may be made therein without departing from the spirit of the invention and within the scope and range of equivalents of the claims. Additionally, well-known elements of exemplary embodiments will not be described in detail or will be omitted so as not to obscure the relevant details of the systems and methods.

Additional advantages and other features characteristic of the systems and methods will be set forth in the detailed description that follows and may be apparent from the detailed description or may be learned by practice of exemplary embodiments. Still other advantages of the systems and methods may be realized by any of the instrumentalities, methods, or combinations particularly pointed out in the claims.

Other features that are considered as characteristic for the systems and methods are set forth in the appended claims. As required, detailed embodiments of the systems and methods are disclosed herein; however, it is to be understood that the disclosed embodiments are merely exemplary of the systems and methods, which can be embodied in various forms. Therefore, specific structural and functional details disclosed herein are not to be interpreted as limiting, but merely as a basis for the claims and as a representative basis for teaching one of ordinary skill in the art to variously employ the systems and methods in virtually any appropriately detailed structure. Further, the terms and phrases used herein are not intended to be limiting; but rather, to provide an understandable description of the systems and methods. While the specification concludes with claims defining the systems and methods of the invention that are regarded as novel, it is believed that the systems and methods will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems and methods. Advantages of embodiments of the systems and methods will be apparent from the following detailed description of the exemplary embodiments thereof, which description should be considered in conjunction with the accompanying drawings in which.

DETAILED DESCRIPTION OF THE INVENTION

Figure 1:
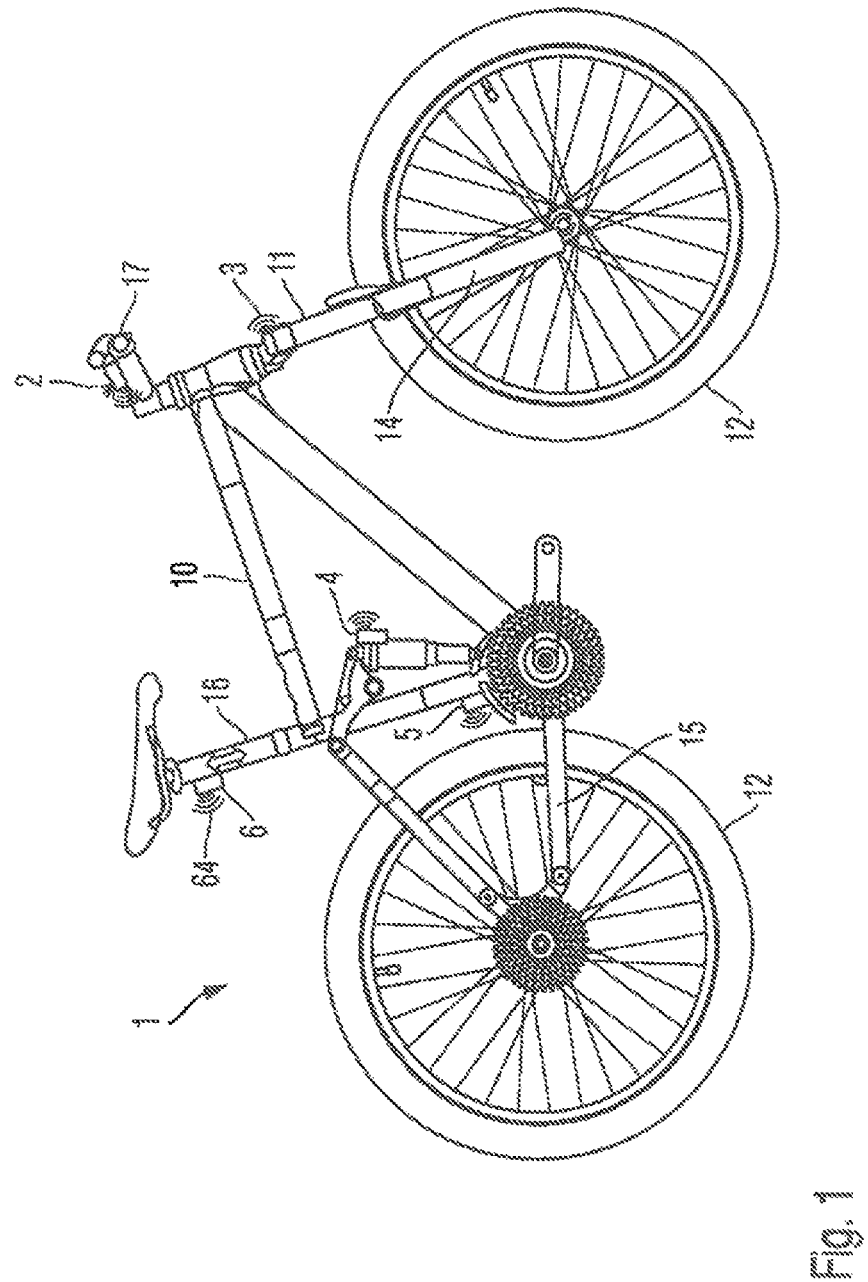
FIG. 1 is a side elevational view of an exemplary embodiment of a bicycle equipped with an electronically controlled suspension system.

As required, detailed embodiments of the systems and methods are disclosed herein; however, it is to be understood that the disclosed embodiments are merely exemplary of the systems and methods, which can be embodied in various forms. Therefore, specific structural and functional details disclosed herein are not to be interpreted as limiting, but merely as a basis for the claims and as a representative basis for teaching one skilled in the art to variously employ the systems and methods in virtually any appropriately detailed structure. Further, the terms and phrases used herein are not intended to be limiting; but rather, to provide an understandable description of the systems and methods. While the specification concludes with claims defining the features of the systems and methods that are regarded as novel, it is believed that the systems and methods will be better understood from a consideration of the following description in conjunction with the drawing figures, in which like reference numerals are carried forward.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Alternate embodiments may be devised without departing from the spirit or the scope of the invention. Additionally, well-known elements of exemplary embodiments of the systems and methods will not be described in detail or will be omitted so as not to obscure the relevant details of the systems and methods.

Before the systems and methods are disclosed and described, it is to be understood that the terminology used herein is for the purpose of describing particular embodiments only and is not intended to be limiting. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including" and/or "having," as used herein, are defined as comprising (i.e., open language). The terms "a" or "an", as used herein, are defined as one or more than one. The term "plurality," as used herein, is defined as two or more than two. The term "another," as used herein, is defined as at least a second or more. The description may use the terms "embodiment" or "embodiments," which may each refer to one or more of the same or different embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact (e.g., directly coupled). However, "coupled" may also mean that two or more elements are not in direct contact with each other, but yet still cooperate or interact with each other (e.g., indirectly coupled).

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

Relational terms such as first and second, top and bottom, and the like may be used solely to distinguish one entity or action from another entity or action without necessarily requiring or implying any actual such relationship or order between such entities or actions. The description may use perspective-based descriptions such as up/down, back/front, and top/bottom. Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

It will be appreciated that embodiments of the systems and methods described herein may be comprised of one or more conventional processors and unique stored program instructions that control the one or more processors to implement, in conjunction with certain non-processor circuits and other elements, some, most, or all of the functions of the powered injector devices described herein. The non-processor circuits may include, but are not limited to, signal drivers, clock circuits, power source circuits, and user input and output elements. Alternatively, some or all functions could be implemented by a state machine that has no stored program instructions, or in one or more application specific integrated circuits (ASICs) or field-programmable gate arrays (FPGA), in which each function or some combinations of certain of the functions are implemented as custom logic. Of course, a combination of these approaches could also be used. Thus, methods and means for these functions have been described herein.

The terms "program," "software," "software application," and the like as used herein, are defined as a sequence of instructions designed for execution on a computer system. A "program," "software," "application," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

Herein various embodiments of the systems and methods are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments. Referring now to the figures of the drawings in detail and first, particularly to FIG. 1, there is shown a first exemplary embodiment of a bicycle. The bicycle 1 has a frame 10 that, for the purposes of the below description, represents a first, stationary part of the bicycle. The frame 10 carries in generally known manner a saddle above a seat post 16 and a foot pedal by which a user can produce a driving force. The driving force or the torque can be detected through a torque sensor 5. The driving force is transmitted to the rear wheel 12 through a chain and an optional shifting system.

The seat post 16 can be height-adjustable and, therefore, the cyclist can adopt, uphill or in the plane, a high seat position that allows a better and ergonomic power transmission to the foot pedal. In downhill rides, the seat post can be retracted to obtain a low seat position with favorable focal point position. Height adjustment of the seat post can be made as in an office chair through a gas pressure spring or a steel spring and, therefore, the cyclist can adjust the height while riding and does not have to descend. The height adjustment can be triggered through an operating element at the handlebar, the operating element being connected to the seat post through a hydraulic system or a Bowden cable. In some of the exemplary embodiments, the height adjustment can be triggered through a radio signal. The radio signal can be transmitted, e.g., through an operating element at the handlebar and, therefore, a Bowden cable or a hydraulic line is not necessary. In other exemplary embodiments, the radio signal can be transmitted by the electronic unit depending on the riding condition and, therefore, the saddle height is also adjusted in automated fashion along with the respectively optimum adjustment of at least one spring element.

The bicycle 1 has two wheels 12. The front wheel 12 is rotatably mounted on a suspension fork to steer the bicycle 1. The suspension fork has stanchion tubes 11 that are connected to the frame 10 in a substantially immovable fashion and slider tubes 14 into which the stanchion tubes 11 immerse when the front wheel is deflected. The force opposite to the immersion is produced by a spring element 3, which is described in more detail by FIGS. 11 to 15. A handlebar tube 17 serves for steering the bicycle 1 and also carries an operating element 2 and, therefore, the user can be informed on the operating parameters of the system and/or can manually influence the parameters of the spring elements 3 and 4.

The rear wheel 12 is attached to movable chainstays 15. The forces transmitted to the frame 10 during the deflection or during a load are absorbed by the spring element 4. The forces opposed in this case to the deflected rear wheel 12 are defined by the parameters of the spring element 4, which is explained in more detail by FIGS. 8 to 10.

Finally, an electronic module 6 is mounted on the seat post 16 and produces control signals for the actuators in the spring elements 3 and 4. The operating element 2, the torque sensor 5 and the spring elements 3 and 4 are connected to the electronic module 6 through a radio signal 64. As a result, weight for cable connections or Bowden cables can be saved, on the one hand, and a high operational reliability can be ensured, on the other hand, because neither electric terminal contacts can corrode nor the cable can be damaged mechanically. In some of the exemplary embodiments, the electronic module 6 and/or the operating element 2 can be a cell phone where correspondingly adapted software is executed. As a result, a dedicated electronic module connected to the bicycle is dispensed with.

Figure 2:
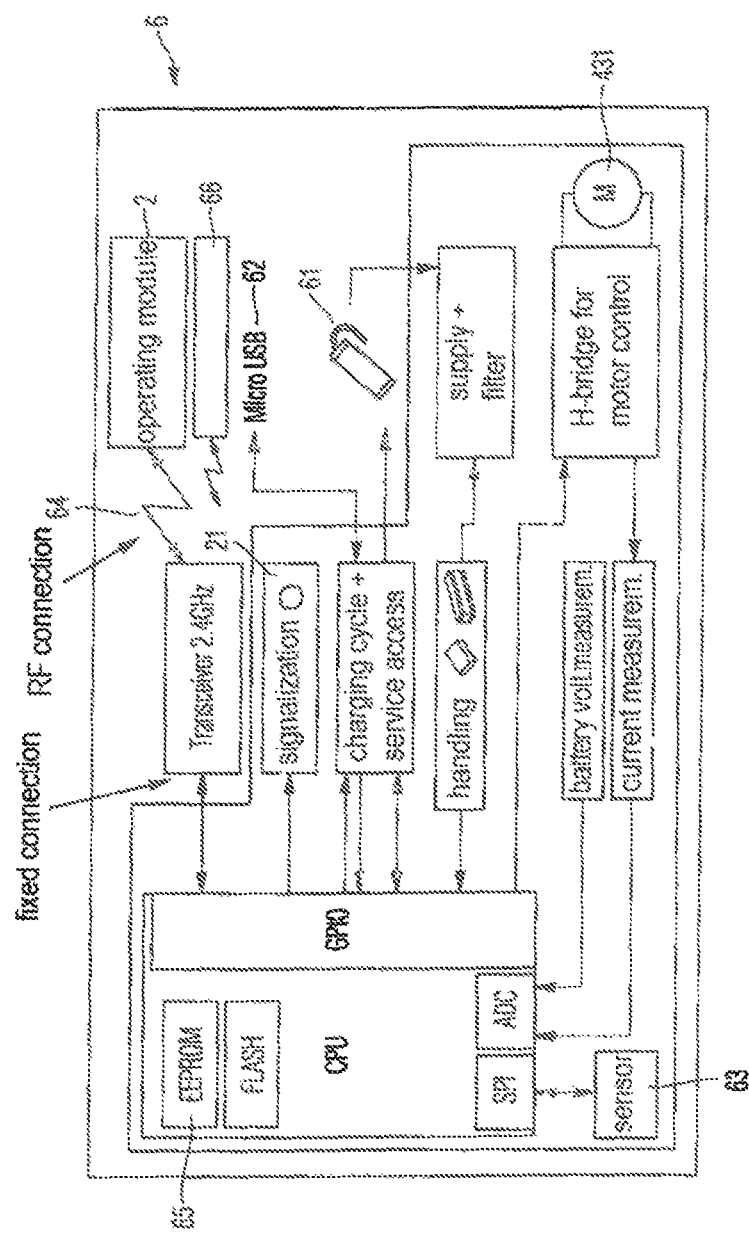
FIG. 2 is a block diagram of employed electronic components of an electronically controlled suspension system for a bicycle.
Figure 3:
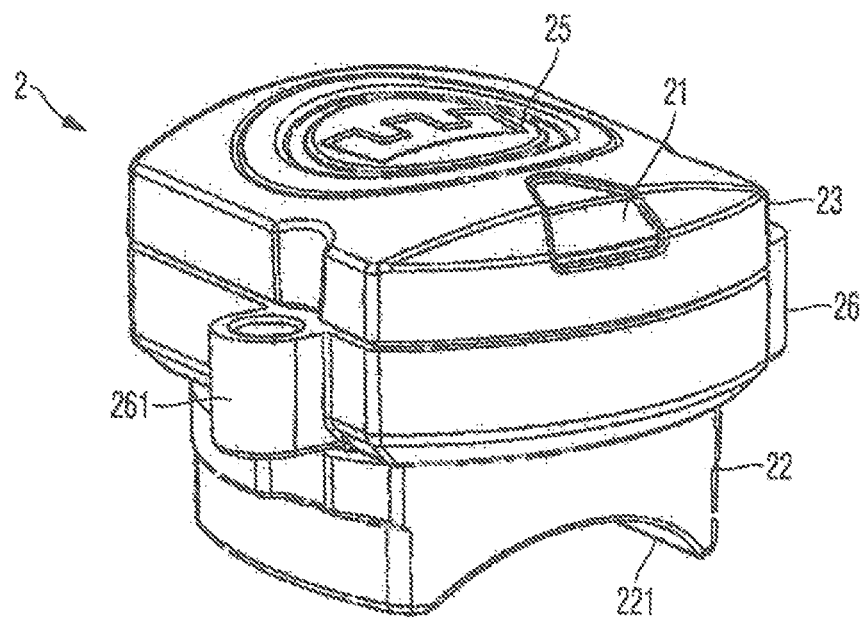
FIG. 3 is a perspective view of an operating element of an electronically controlled suspension system for a bicycle.
Figure 4:
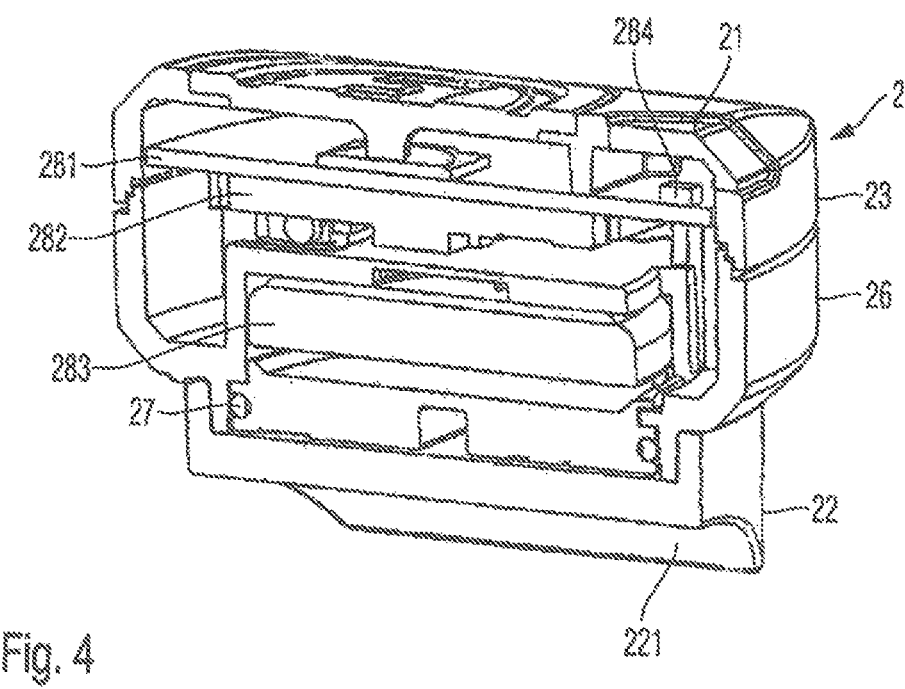
FIG. 4 is a cross-sectional view of the operating element of FIG. 3.

FIG. 2 shows a block diagram of the electronic module 6 and further peripheral components. The electronic module 6 contains a microprocessor CPU on which a computer program runs that calculates a control signal for the actuators from input variables of the sensors. The computer program can be filed in an EEPROM 65 or a flash memory and, therefore, the respective data is not lost even in the case of turning-off of the device or a deep discharge of the battery 61. In addition, the flash memory can contain configuration data, e.g., user's preferences or topographic data, e.g., digitized maps with height information and/or information on the road quality. Data can be supplied to the microprocessor and the memories 65 through a serial interface GPIO or SPI and/or an analog-to-digital converter ADC. This data can contain software updates or topographic data that can be supplied through a USB interface 62, for example. The latter can optionally also be used for charging the battery 61. In other exemplary embodiments, a separate charging interface can be present for this purpose or the battery 61 is replaced after its discharge or charged outside the electronic module 6. The voltage and/or the current drawn from the battery 61 can be monitored through the analog-to-digital converter ADC by the microprocessor CPU. As a result, the chassis can be taken into an emergency program when the battery 61 has been discharged. In some of the exemplary embodiments, the electronic module 6 can be equipped with the CPU, the EEPROM 65, the memory 65, the serial interface GPIO or SPI, the USB interface 62 and the battery 61 in the form of a cell phone or a smartphone or a tablet computer.

Finally, the electronic module 6 can contain an acceleration sensor 63 that can detect a change in the riding speed and/or a travelling on curved roads. In other exemplary embodiments, the acceleration sensor 63 can also be attached to the bicycle 1 in a separate assembly or can be part of the operating element 2 and transmit its data through a radio signal 64. As described in analogy to the acceleration sensor 63, the electronic module 6 can also contain a tilt sensor, a speed sensor, or a position sensor. FIG. 2 shows the position sensor 66 as a separate assembly that is connected to the electronic module 6 through a radio signal 64. In some of the exemplary embodiments, only a multi-axis acceleration sensor can be present from the data of which a speed vector and a tilt or position vector can be calculated by integration over time. To determine a coordinate zero point, an initialization can be made by placing the bicycle upright on a level area and subsequently storing this position as a horizontal rest position. All further positions, such as lateral tilt, up-hill ride, downhill ride and the current speed follow therefrom by integration of the accelerations in all three spatial directions. Should the bicycle not be upright during the initialization, but, e.g., have a higher front or rear wheel, the cyclist can also choose a different coordinate zero point. This permits individual fine tuning.

Finally, FIG. 2 shows how to connect an operating element 2 to the electronic module 6 through the radio signal 64. The operating element 2 as such is specified below by means of FIGS. 3 to 7. The electronic module 6 according to FIG. 2 additionally contains an operating condition indicator 21. In other exemplary embodiments, the operating condition indicator 21 can be a component of the operating element 2 or be integrated into a spring element 3 or 4.

The electronic module 6 can contain an optional H-bridge for the motor control when the actuator 431 contains at least one electric motor. In other exemplary embodiments, the actuator 431 can also be a component of the spring element 3 or 4 together with the H-bridge and, therefore, these components need not be integrated into the electronic module 6.

FIGS. 3 to 7 show an exemplary embodiment of an operating element 2. Here, equal parts have equal reference signs and, therefore, not all the components are explained in connection with all the figures to avoid repetitions.

In the exemplary embodiment shown, the operating element 2 has a three-part housing. Here, the lower housing part 22 has a concave inner surface 221, by which the lower housing part 22 can abut against a handlebar tube 17. This configuration permits a safe assembly and the operating element 2 is protected from twisting, tilting, or moving out of place. The middle housing part 26 is adapted for receiving a battery cell 283, e.g., a lithium ion battery, an alkali battery, or a zinc-air battery. Penetration of moisture between the middle housing part 26 and the lower housing part 22 is prevented by a gasket 27. A screw connection allows easy opening and closing and, therefore, it is easy to exchange the battery 283. The upper housing part 23 has a window 21 through which light from a light-emitting diode 284 can reach the observer. As a result, it is possible to realize an operating condition indicator when the light-emitting diode 284 emits light of different colors or intermittent light having different flashing patterns. Furthermore, the upper housing part 23 has a push button 25 by which the cyclist can transmit control signals to the electronic module 6 when standing or during a ride. To this end, the operating element 2 has a simple electronic circuit disposed on a pc board 281 and detects the pushing of the button 25 as well as carries the light-emitting diode 284 and supplies it with electric energy.

A second pc board 282 is disposed therebelow and carries a high-frequency interface to establish a radio connection to the electronic module 6. As a result of the two-part design, the transmitting HF part of the circuit can easily be exchanged to comply with different legal provisions in different countries or to enable an adaptation to different transmitting protocols.

Figure 6:
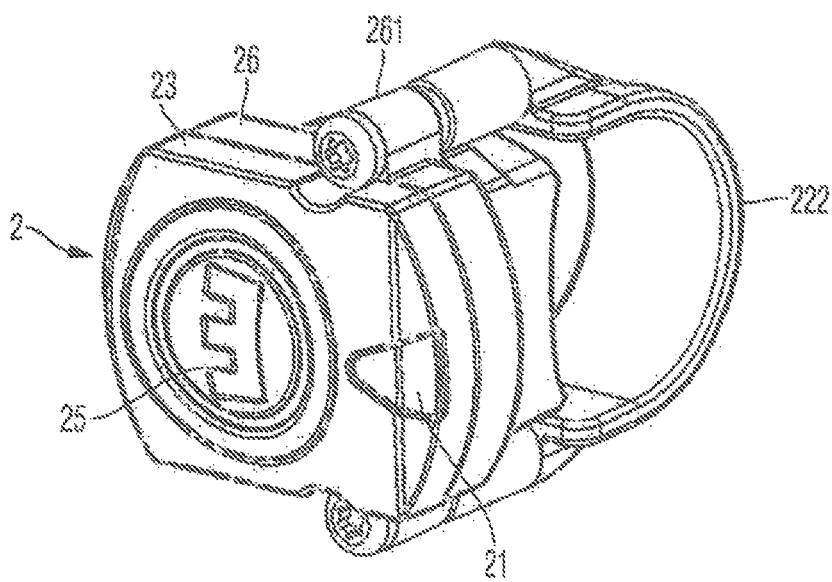
FIG. 6 is a perspective view of another exemplary embodiment of an assembly of the operating element of FIG. 3.
Figure 7:
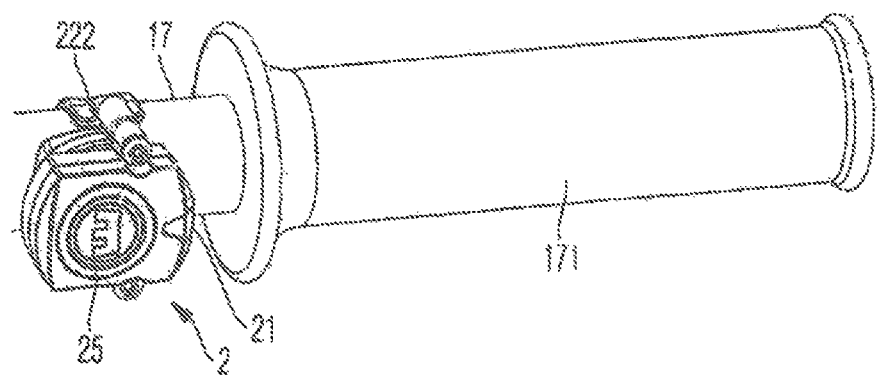
FIG. 7 is a perspective view of the assembly of the operating element of FIG. 6 attached to part of a handlebar tube.

FIGS. 6 and 7 show the attachment of the operating element 2 to an optional clamp 222 through a screw connection 261. As a result, the operating element 2 can be positioned at any point of a handlebar tube 17. The operating element 2 is advantageously disposed in the vicinity of a handle 171 and, therefore, the user can reach the button 25 without taking a hand off the handlebar. This allows a safe operation of the bicycle and an adjustment of the suspension system in any riding condition.

Figure 5:
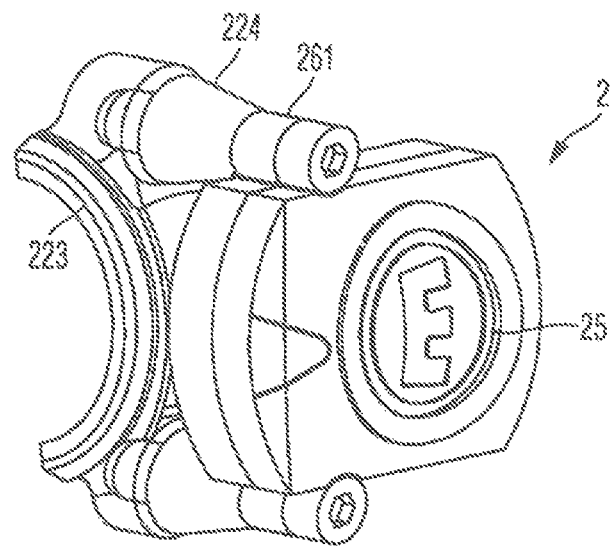
FIG. 5 is a perspective view of one exemplary embodiment of an assembly of the operating element of FIG. 3.

FIG. 5 shows an alternative form of attachment to an existing attachment clamp 223. The attachment clamp 223 can be a component of a brake and/or gearshift lever that is already attached to the handlebar tube 17 to enable the actuation of a brake or a gearshift. The operating element 2 can additionally be attached to the clamp 223 through spacer bolts 224 and a screw connection 261 and, therefore, the use of a further clamp 222 is dispensable. As a result, it is thus possible to save weight, on the one hand, and to increase the reliability, on the other hand, because there is no notch effect of a further clamp 222 on the handlebar tube 17. Finally, all this leads to a tidy and attractive optics for the user.

Figure 8:
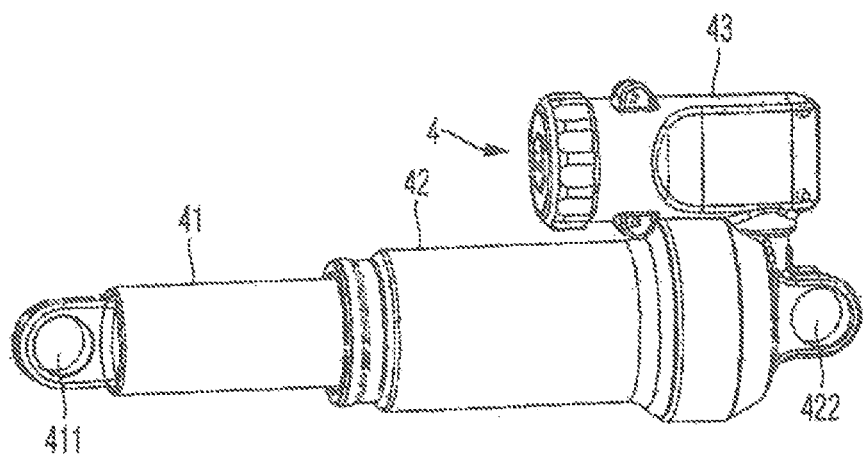
FIG. 8 is a perspective view of a first exemplary embodiment of a spring element.
Figure 9:
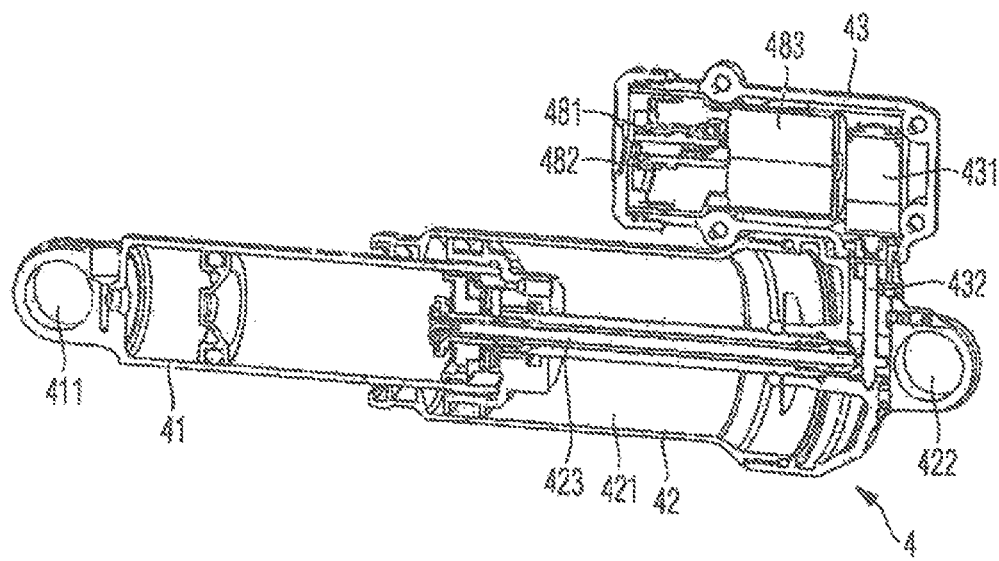
FIG. 9 is a cross-sectional view of the spring element of FIG. 8.
Figure 10:
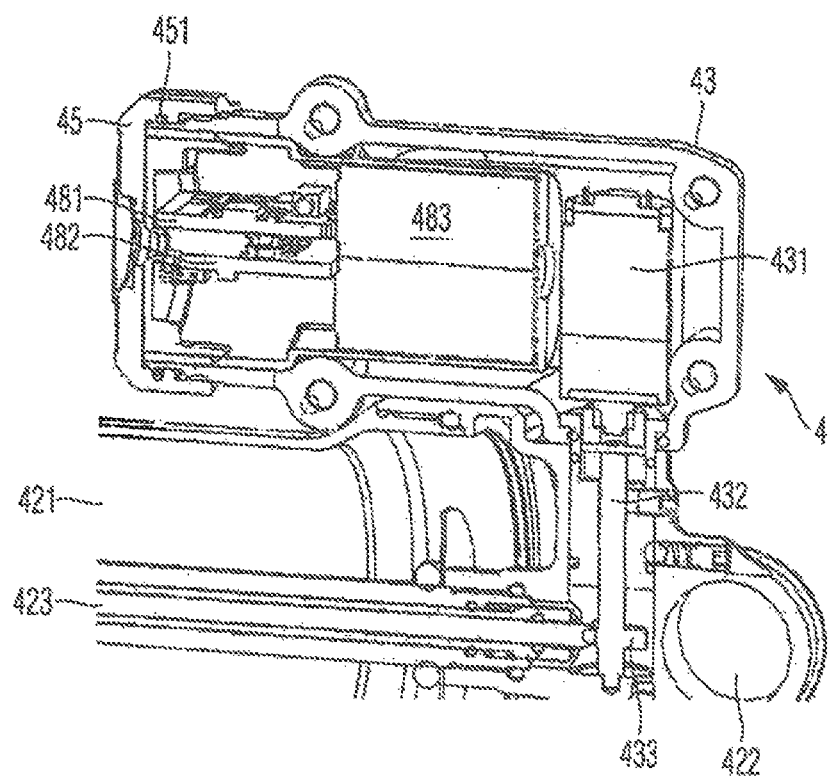
FIG. 10 is an enlarged, cross-sectional view of a portion of the spring element of FIG. 9.
Figure 11:
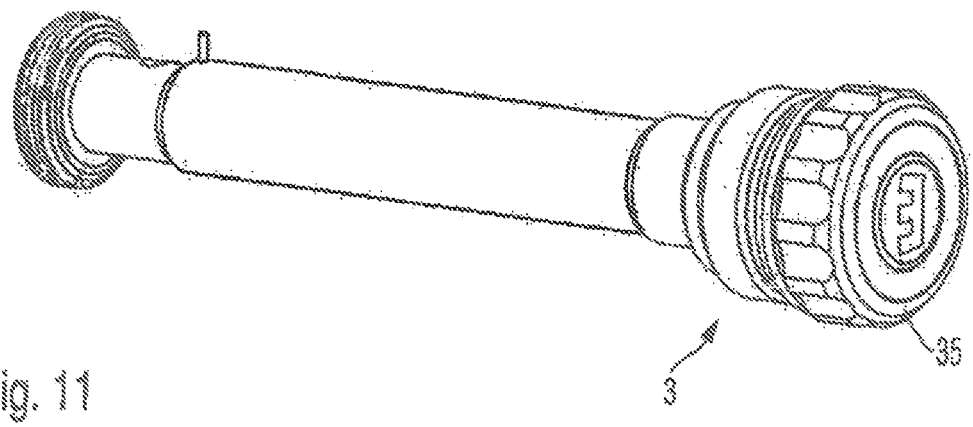
FIG. 11 is a perspective view of another exemplary embodiment of a spring element.
Figure 12:
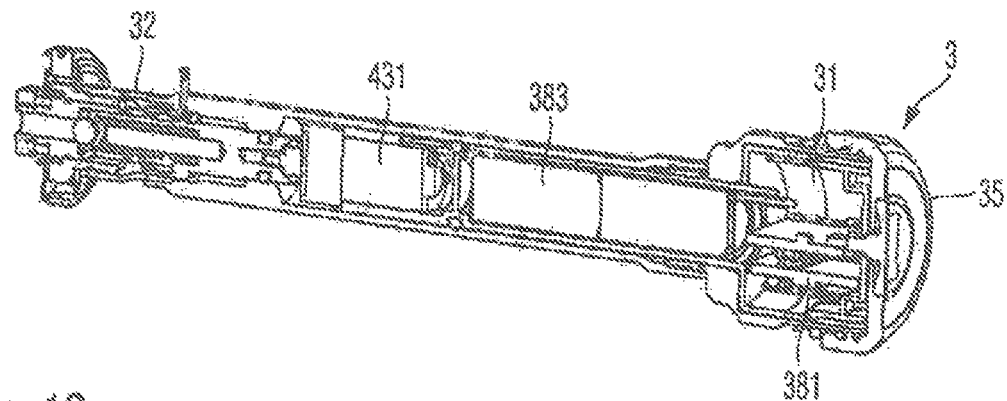
FIG. 12 is a cross-sectional view of the spring element of FIG. 11.
Figure 13:
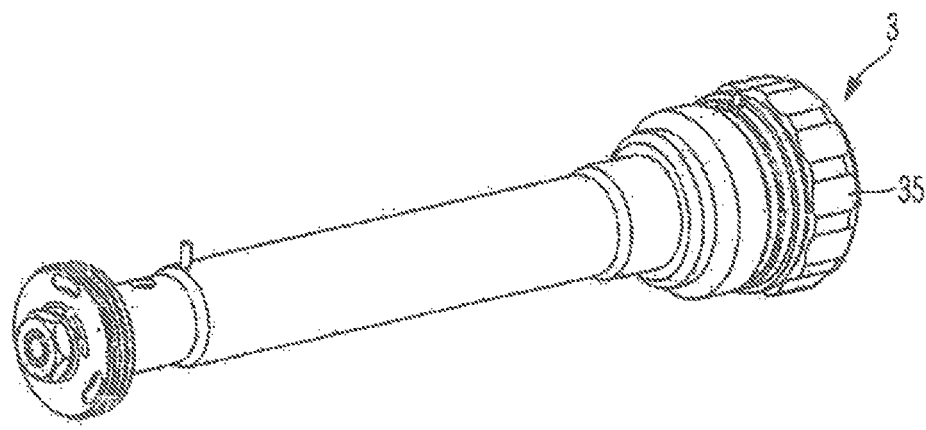
FIG. 13 is a perspective view of the spring element of FIG. 11 from a mechanical adjustment side of the spring element.
Figure 14:
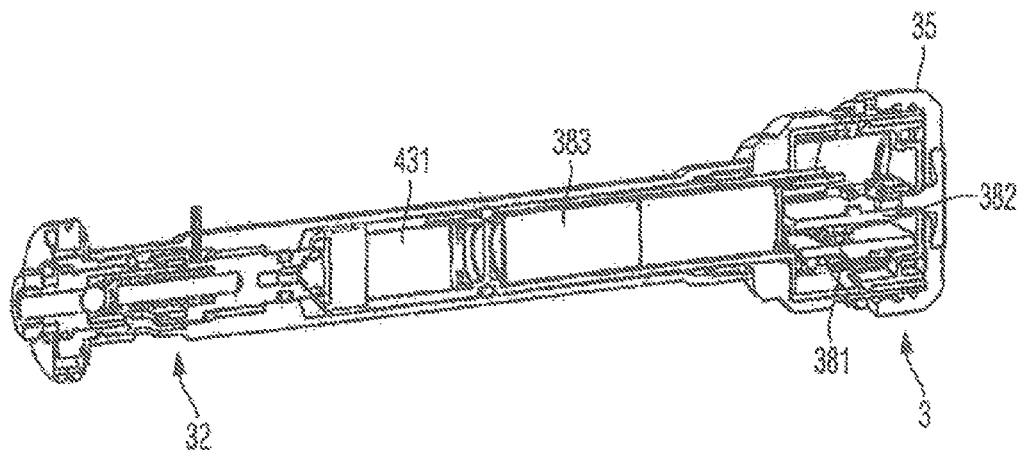
FIG. 14 is a cross-sectional view of the spring element of FIG. 11.

An exemplary embodiment of a spring element 4 is explained by FIGS. 8 to 10. In this case, too, equal reference signs designate equal components of the spring element 4. As evident from FIG. 1, the spring element 4 is provided for use at spring-suspended chainstays or a rear wheel suspension. The spring element has a base body 42 in which an air chamber 421 is disposed. A piston 41 slides in the air chamber 421, wherein the compressed air counters the piston 41 with resistance. The base body 42 and the piston 41 can be attached to the chainstays 15 or the frame 10 by the mounting eyes 422 and 411 and, therefore, depending on the loads acting on the wheels 12, the piston 41 is deflected in the air chamber 421. In other exemplary embodiments, a helical spring can be used instead of the air chamber 421, which is made of steel, for example.

In some of the exemplary embodiments, the suspension pattern and/or the damping pattern and/or the suspension travel available can be influenced by an actuation member 423. Here, the user can adapt in a generally known manner the response pattern of the rear wheel suspension to the respective operating condition of the bicycle or completely block the suspension at times (lock-out).

The actuation member 423 can be actuated through a cam 433 of a shaft 432. The shaft 432 is connected to an actuator 431 that acts as an actuator in the present exemplary embodiment. The control signal for the actuator 431 is produced in the electronic module 6 and transmitted through a radio connection that is provided by the HF pc board 482. A second pc board 481 can decode the received signals and/or support an H-bridge that energizes the actuator 431. A battery 483 is available to supply energy to the electronic controls 481 and 482 and to the actuator 431. This battery 483 can be recharged through a charging socket, which is accessible after a screw cap 45 is removed. In some of the exemplary embodiments, the charging state of the battery 483 can be visualized through the operating condition indicator 21 at the operating element 2.

The electronic modules 481, 482, the battery 483, and the actuator 431 can be accommodated in a dust-free and splashing water-sealed fashion in a housing 43 and, therefore, they are not impaired while riding the bicycle 1. As regards a dust-free and splashing water-sealed closure, the screw cover 45 can be provided with a gasket 451.

Finally, FIGS. 11 to 15 describe a spring element 3 that is intended for use at a suspension fork. The spring element 3 is disposed in the stanchion tube 11 of the fork in a generally known manner and counters the immersion into the slider tube 14 by a defined resistance. The quality and quantity of this resistance force characterize the suspension pattern of the fork and can be adjusted by a mechanical adjustment system 32 in a general known manner. As a result, the spring force, the damping force, and/or the height of the fork or its unloaded zero position can be adjusted by the user. This can also be made in the present case by either the user's interference through the operating element 2 or the button 25 disposed thereon or in an automated fashion, in that the electronic module 2 selects a respectively appropriate pattern depending on the input variables of the optionally present sensors. To move the mechanical adjustment system 32 in an automated fashion, there is again provided an actuator 431, which can be an electric motor, a piezo-valve controller, or a solenoid-valve controller, for example. Like the electronics 381 and 382, the actuator 431 is supplied with electrical energy by a battery 383. As described above, the electronics of the spring element 3 can contain a high-frequency part on a pc board 382 and a control logic for the actuator 431 on a further pc board 381. In other exemplary embodiments of the invention all electronic components can, however, also be disposed on a single pc board.

Figure 15:
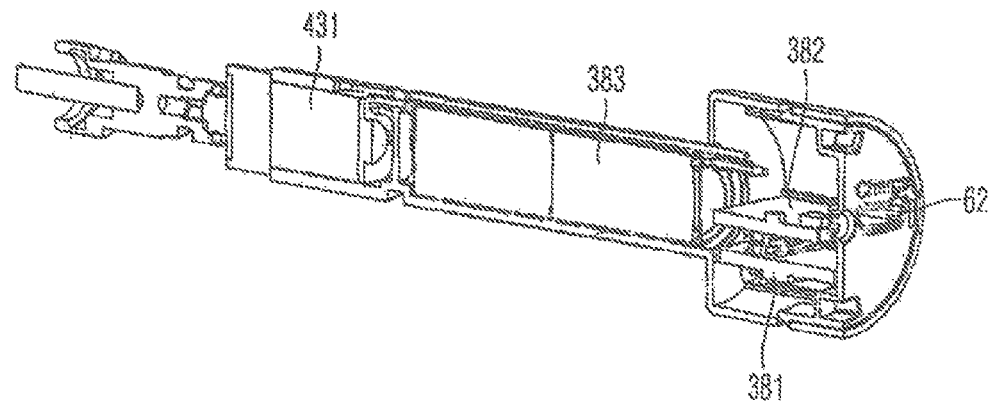
FIG. 15 is a cross-sectional view of a detail of the spring element of FIG. 11.

After detaching a screw cap 35, the part shown in FIG. 15 and including the actuator, the battery, and the electronic control can be removed from the fork for maintenance work to thus exchange the battery 383, for example. In addition, a charging socket 62 is available after detaching the screw cap 35 without further disassembly work, said socket 62 serving for recharging the battery 383 in a normal operation of the bicycle. The charging condition of the battery 383 can also be monitored by the electronic module 6 and be visualized by the operating condition indicator 21.

The exemplary embodiment of the suspension system thus offers, on the one hand, the possibility to change the response pattern of the suspension system in a formerly known manner by the user's manual interference; however, on account of lacking Bowden cables and/or cable systems, the operational reliability is increased and the weight is reduced. The electronic adjustment here offers the advantage that the suspension at the front and rear wheels can be adjusted at the same time. Furthermore, the suspension proposed herein can enable an automatic riding operation on account of the algorithms implemented in the software of the electronic module 6, in which the front and/or rear suspension patterns and/or the response of an optional suspended seat post 16 can be adapted to the respective operating condition in fully automated fashion. The adaptation can here be made depending on the speed, the acceleration, the position, the terrain topography, the road condition, and/or the applied torque.

Figure 16:
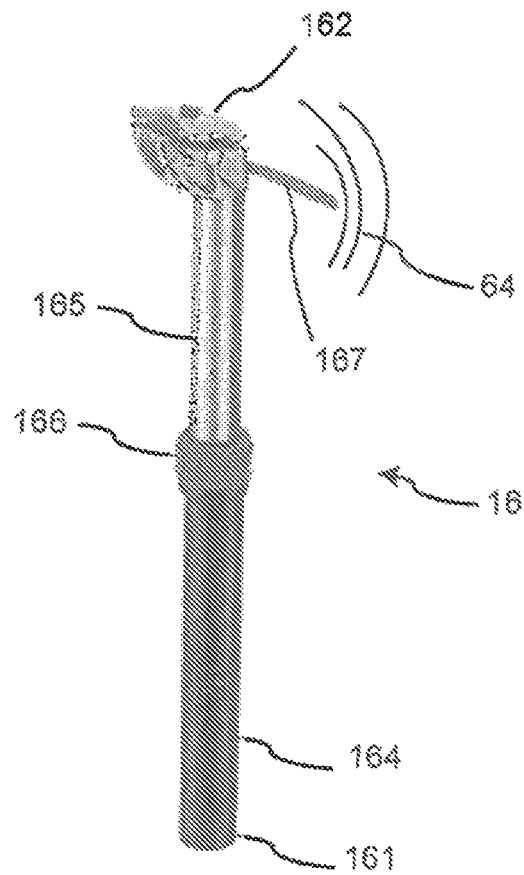
FIG. 16 is a perspective view of an exemplary embodiment of a seat post.

FIG. 16 shows an exemplary embodiment of a seat post 16 usable for a bicycle, for example. The seat post 16 has a first end 161 that can be connected to a bicycle frame 10. The connection can be made by a clamp. Furthermore, the seat post 16 can have a second end 162 that can be connected to a saddle. To this end, a clamping bolt can be used that, in some of the exemplary embodiments, also enables an adjustment of the tilt and/or a longitudinal adjustment of the saddle. The seat post 16 has at least one upper longitudinal portion 165 and at least one lower longitudinal portion 164 that mesh with each other and are slidable relative to one another along their longitudinal extension. The more the upper longitudinal portion 165 meshes with the lower longitudinal portion 164, the lower is the adjustment of the saddle. Furthermore, the seat post 16 has a fixing apparatus 166 by which the two longitudinal portions 164, 165 can be fixed in a settable relative position to one another. The fixing apparatus 166 can be influenced by a radio signal 64. To receive the radio signal, an optional antenna 167 is available, which can also have a different design in other exemplary embodiments of the invention.

The two longitudinal portions 164 and 165 are connected to each other through a gas pressure spring that is covered in the figures and thus not visible. When the fixing apparatus 166 is detached, the longitudinal portion 165 is extended and, therefore, the seat height is enlarged. The seat post 16 thus allows a simple adjustment of the saddle height during a ride and, therefore, the seat height can be adapted to the respective riding condition. When the radio signal 64 is produced by the operating element 2, the cyclist can keep both his hands on the handlebar when he adjusts the seat height and, therefore, safe control over the bicycle is enabled. In some of the exemplary embodiments, the radio signal 64 can be produced by an electronic module 6 and, therefore, an automatic height adjustment is enabled depending on the riding condition. If the seat post 16 has a position transducer that reports the position of the seat post 16 to the electronic module 6, the electronic module 6 can reuse this data to determine a control signal for the chassis components.

The invention is, of course, not limited to the exemplary embodiments shown in the figures. The above description should not be regarded as limiting but as explanatory. Features of different, above specified embodiments of the invention can be combined into further embodiments. The below claims should be comprehended to the effect that a feature mentioned is present in at least one embodiment of the invention. This does not exclude the presence of further features. Should the claims and the above description define "first" and "second" features, this designation serves for distinguishing two like features without determining a rank order.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The foregoing description and accompanying drawings illustrate the principles, exemplary embodiments, and modes of operation of the systems and methods. However, the systems and methods should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the systems and methods as defined by the following claims.

What is claimed is:

1. A seat post for a bicycle, comprising:
   an electronic module
      generating a radio signal dependent upon one or more of terrain topography, velocity, acceleration, position, torque, and road surface condition; and
      implements at least one first operating condition and at least one second operating condition, wherein, in the second operating condition, the number of functions that can be executed is reduced and the energy consumption is lowered as compared to the first operating condition; and
   a post body having:
      a first end shaped to be connected to a bicycle frame;
      a second end shaped to be connected to a saddle;
      at least two longitudinal portions meshing with each other and slidable relative to one another along a longitudinal extension; and
      a fixing apparatus by which the two longitudinal portions can be fixed to one another in a settable relative position, the fixing apparatus being influenced to selectively fix and unfix by the radio signal.

2. The seat post according to claim 1, wherein the two longitudinal portions are connected to each other through a gas pressure spring.

3. The seat post according to claim 1, further comprising an antenna associated with the fixing apparatus and receiving the radio signal.

4. The seat post according to claim 1, wherein the electronic module comprises a cell phone.

5. The seat post according to claim 1, wherein the electronic module comprises at least one micromechanical acceleration sensor.

6. The seat post according to claim 5, wherein the at least one micromechanical acceleration sensor is at least one multi-axis micromechanical acceleration sensor measuring acceleration in three dimensions.

7. The seat post according to claim 5, wherein:
the at least one micromechanical acceleration sensor generates raw data; and
the electronic module determines at least one of a velocity and a position by integration of the raw data of the at least one micromechanical acceleration sensor.

8. The seat post according to claim 1, wherein the electronic module changes from the first operating condition to the second operating condition when no acceleration is detected over a settable time period.

9. The seat post according to claim 1, wherein the electronic module changes from the second operating condition to the first operating condition when an acceleration is detected.

10. The seat post according to claim 1, wherein:
in the at least one first operating condition, a given number of functions can be executed and a given amount of energy is consumed; and
in the at least one second operating condition, less than the given number of functions can be executed and less than the given amount of energy is consumed.

11. The seat post according to claim 10, wherein the electronic module automatically changes from the first operating condition to the second operating condition when the electronic module determines that no acceleration has been detected over a user-settable period of time.

12. The seat post according to claim 10, wherein the electronic module changes from the second operating condition to the first operating condition when acceleration is detected.

13. The seat post according to claim 1, further comprising an electronic module programmed to control at least one suspension system of the bicycle.

14. The seat post according to claim 1, further comprising an electronic module containing a map memory storing topographic information.

15. The seat post according to claim 1, wherein the electronic module comprises a map memory storing topographic terrain information.

* * * * *